May 28, 1957 E. K. THOMSON 2,793,736
CONVEYOR SYSTEM
Filed Dec. 1, 1953 3 Sheets-Sheet 1
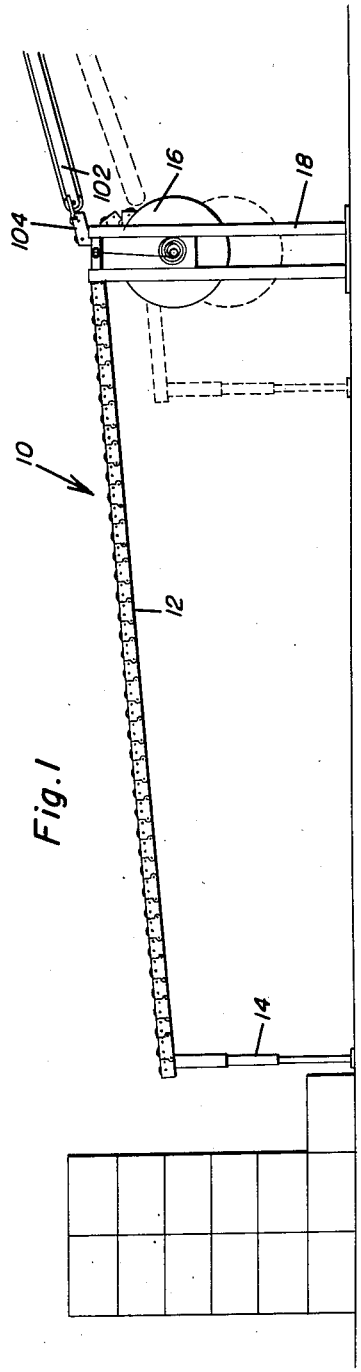
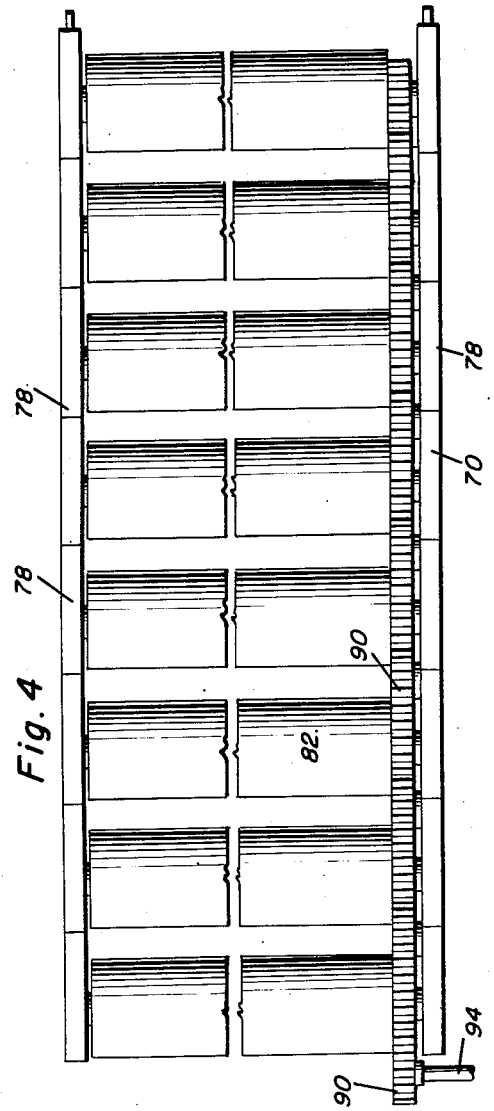
Ely K. Thomson
INVENTOR.

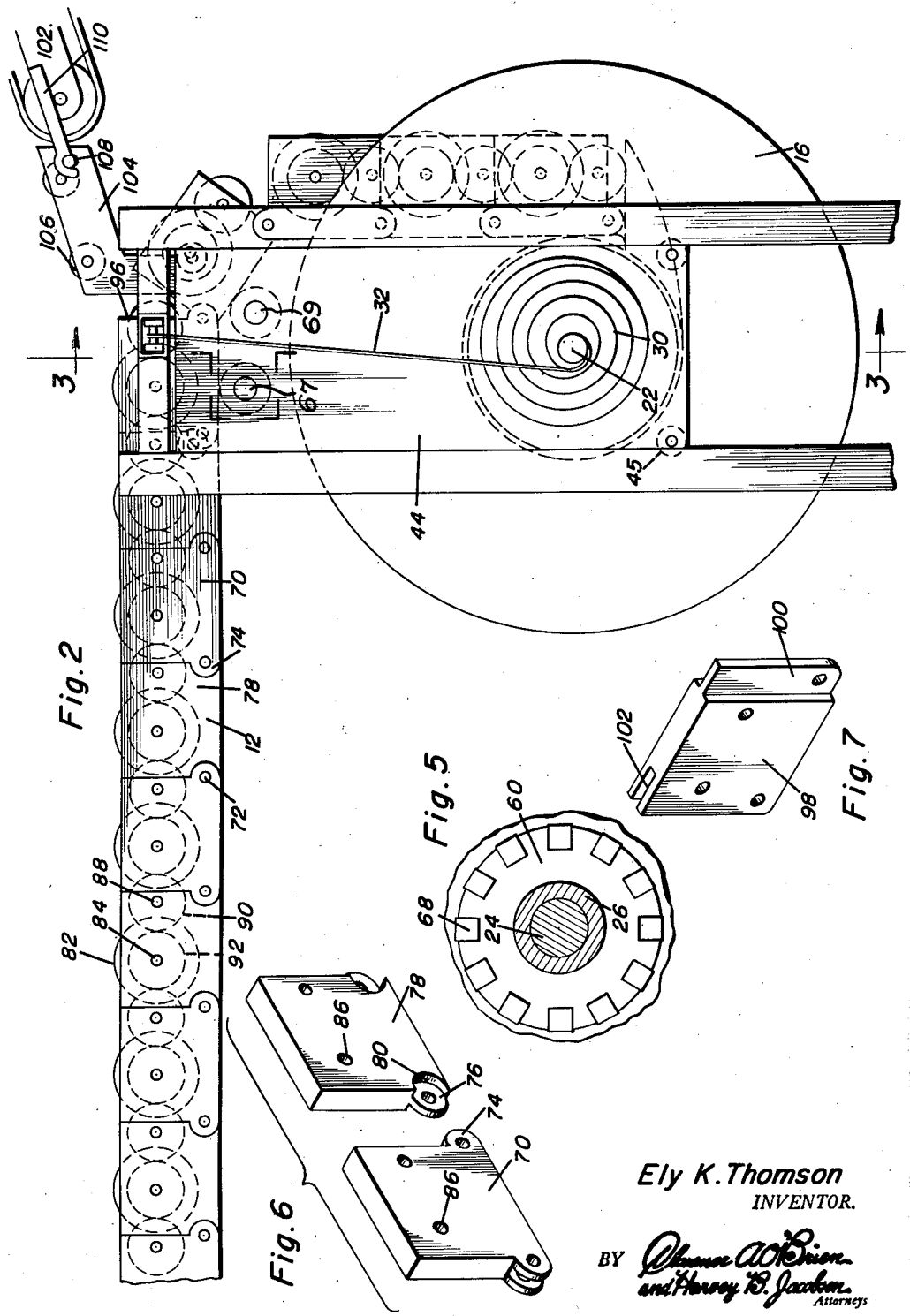

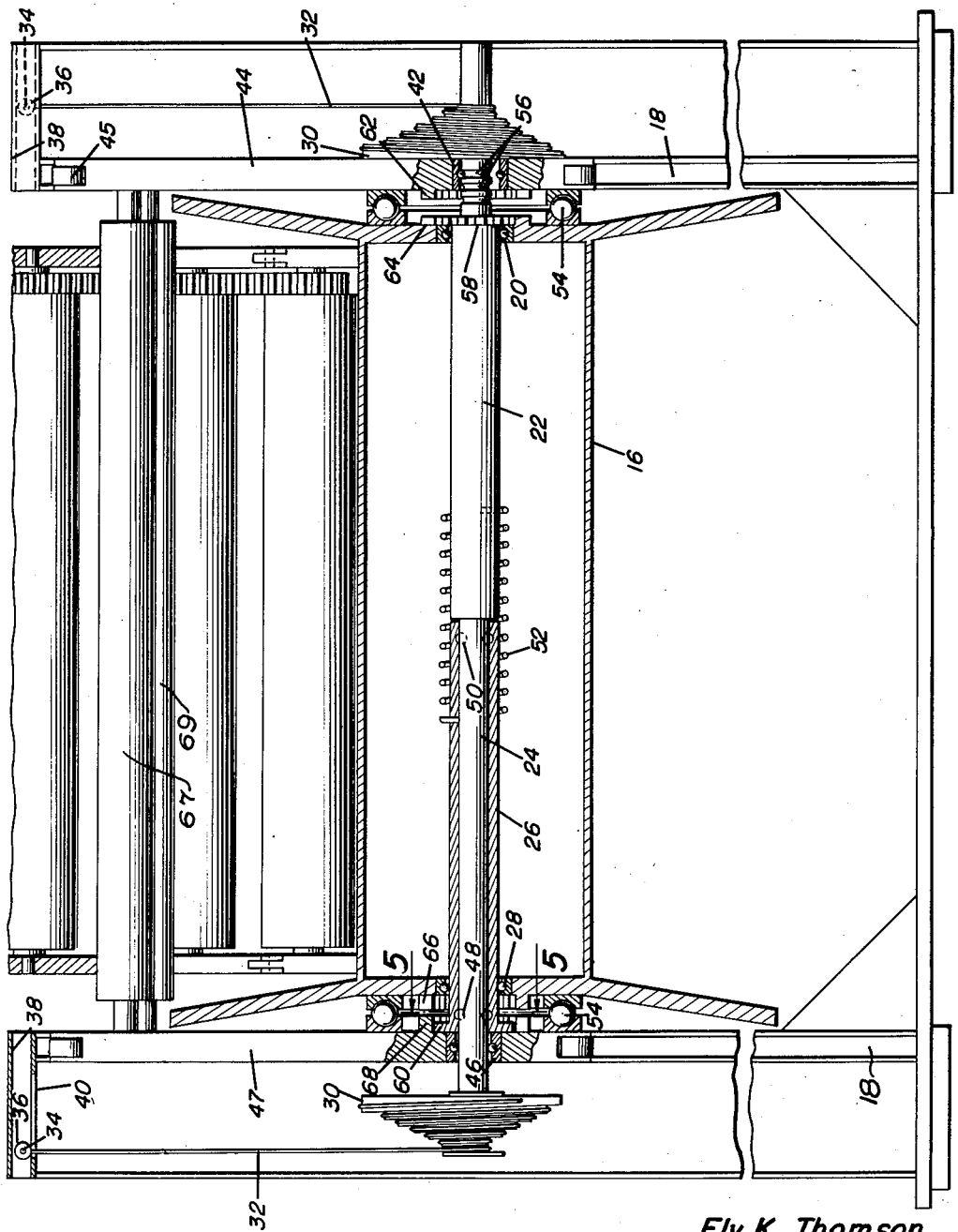

United States Patent Office 2,793,736
Patented May 28, 1957

2,793,736

CONVEYOR SYSTEM

Ely K. Thomson, Orange, Tex.

Application December 1, 1953, Serial No. 395,458

17 Claims. (Cl. 198—127)

This invention relates to the class of conveyors and more particularly to a novel conveyor system utilizing a link conveyor for power operation or for gravity feed.

The primary object of this invention resides in the provision of a conveyor system which may be arranged for power actuation or which may be electively used for gravity feed of the material being conveyed.

A further object of this invention resides in the provision of means for mounting a conveyor so as to maintain the conveyor at a selected angular inclination for optimum gravity feed even though the conveyor is lengthened or shortened as necessary in the handling of material.

The construction of this invention features the combination of a link conveyor which is attached to a drum and supported in such manner so that as the drum is rotated to wind the end of the conveyor thereabout, the drum itself is lowered so as to maintain the angular inclination of the conveyor constant by lowering one end of the conveyor as the conveyor is shortened with the other end thereof remaining at a constant level.

A further object of this invention resides in the provision of rollers which can be suitably powered when the links of the conveyor are in abutting relationship so that gears carried by the links can intermesh with other gears affixed to the rollers to drive the respective rollers.

Still further objects and features of this invention reside in the provision of a conveyor system which is strong and durable, simple in construction and manufacture, capable of being readily used to handle various types of material but which is especially adapted for handling cases and cartons and which is automatic in its function while requiring little maintenance.

These, together with the various ancillary objects and features of the invention which will become apparent as the following description proceeds, are attained by this conveyor system, a preferred embodiment of which has been illustrated in the accompanying drawings, by way of example only, wherein:

Figure 1 is a side elevational view of the conveyor while also showing in phantom lines the conveyor in a foreshortened position;

Figure 2 is an enlarged elevational view of a portion of the conveyor system as arranged for level and power operation;

Figure 3 is a vertical sectional view as taken along along the plane of line 3—3 in Figure 2;

Figure 4 is a plan view of the link conveyor;

Figure 5 is a sectional detail view as taken along the plane of line 5—5 in Figure 3, illustrating the clutch means forming one of the important elements of the invention;

Figure 6 is an exploded perspective view illustrating the construction of the side pieces utilized in the conveyor; and Figure 7 is a perspective view of a modified form of side member.

With continuing reference to the accompanying drawings wherein like reference numerals designate similar parts throughout the various views, reference numeral 10 generally indicates the conveyor system comprising the present invention which is adapted for either level and power feed or for gravity feed, utilizing a link conveyor 12 which is arranged in a suitable angular inclination as is indicated in Figure 1 and which is supported at one end by means of telescoping standards 14. The other end of the conveyor 12 is secured to a drum 16 carried by opposed pairs of channel-shaped supporting standards 18.

Referring now more particularly to Figure 3, it will be noted that the drum 16 is journaled, as by bearings 20, on a shaft 22 which has a portion 24 of lesser diameter for reception of a sleeve 26. Other bearings 28 are provided for journaling the sleeve 26 in the drum 16. Mounted on the ends of the shaft 22 are conical-shaped reels 30 on which cables 32 are wound. The cables 32 are attached to guides, as at 34, mounted on rollers 36 which ride in guide bars 38 carried by and extending between the pairs of channel-shaped standards 18. It is to be noted that the cables 32 extend through slots 40 in the guide bars 38.

The shaft 22 is loosely journaled in bearings 42 mounted in a guide block 44 which is vertically movable by means of rollers 45 within the channel-shaped supporting standards 18. Likewise, a bearing 46 is provided for journaling the shaft portion 24 in the support block 47, it being noted that the sleeve 26 is rotatably mounted on the shaft 24 as by bearings 48 and 50. A coil spring 52 terminally attached to the sleeve 26 and the shaft 22 is mounted co-axial with the shaft 22 and the sleeve 26. Thrust bearings, as at 54, are provided between the drum 16 and the support blocks 44 and 47.

It is to be noted that the shaft 22 is slidable axially relative to the support blocks 44 and 47 inasmuch as the bearing 42 is seated loosely about the shaft with the individual bearing elements of the bearings 42 adapted to seat in one of the sets of grooves, as at 56. There is secured on the shaft 22 a toothed wheel 58 and another toothed wheel 60 is mounted on the sleeve 26. The construction of the toothed wheel 60 which forms a clutch member can best be seen upon an inspection of Figure 5.

Attached to the support block 44 is a set of lugs 62 while in opposed relationship, a set of lugs 64 is mounted on the drum 16. Another set of lugs 66 is mounted on the drum 16 in opposed relationship with the set of lugs 68 mounted on the support block 47.

The conveyor 12 is formed of links arranged to prevent the collapsing or sagging in the center thereof due to the fact that the links are hingedly secured at the lower portions while the upper portions are adapted to abut against each other. The end link of the conveyor 12 is attached to the drum. Extending transversely between the slide blocks 44, 47, just above the reel 16, are a pair of supporting rollers 67, 69 which guide the links of conveyor 12 for winding and unwinding on and from the reel 16. When it is desired to shorten the conveyor 12, it is merely necessary to push upon the conveyor, thus winding the links on the drum. It is to be recognized that the spring 52 may be given an initial tension by holding the sleeve 26 non-rotatable to the support block 47 by the toothed wheel 60 engaging both sets of lugs 66 and 68, while the shaft 22 is in a neutral position between the lugs 62 and 64. A crank may be used to rotate the shaft 22 relative to the drum 16 and relative to the sleeve 26 to provide thereby an initial tension on the spring 52 which will cause the conveyor 12 to be wound on the drum once the conveyor has been moved inwardly.

It is to be noted that in the position for this type operation, the torque supplied by the spring 52 will counteract the torque applied on the shaft 22 by the cables 32 and that as the lever arm formed by the conical reels 30 increases or decreases depending on direction of operation, the torque provided by the spring 52 will vary to compensate for the difference in leverage.

The shaft 22 may be positioned so that the toothed wheel 60 is in engagement with the lugs 68 and with the toothed wheel 58 in engagement with the lugs 64 so that rotation of the shaft 22 will cause rotation of the drum 16, and because of the conical-shaped reels 30 and 34, will lower the drum due to the unwinding of the cables 32, the conical-shaped reels 30 having been designed to compensate for the increased outer surface of the drum 16 due to the fact that a portion of the conveyor is successively wound on the drum 16. It will be appreciated that, when the first few links of the conveyor 12 are wound on the reel 16, the reel 16 has a relatively small effective diameter. As the winding progresses, the conveyor winds upon itself, thereby increasing the effective diameter or circumference of the reel, and accordingly winding a greater linear length of conveyor per revolution of the reel. Similarly, the cable 32, which is wound on conical reels 30, unwinds a relatively small linear length of cable during the first revolution of the reel, and the length of cable unwound per revolution progressively increases as the drum 16 is revolved. Accordingly, the extent and rate of lowering of the drum 16 gradually increases as the conveyor 12 is wound around the drum 16.

When it is desired to utilize this device for level or power control, it is merely necessary to slide the shaft 22 so that the toothed wheel 60 engages the lugs 66 and the toothed wheel 58 engages the lugs 62 which will lock the shaft 22 against rotation but permit the sleeve 26 and hence the drum 16 to rotate relative to the shaft 22. Since the shaft 22 is locked against rotation, the cable 32 is not unwound from its reels 30, 34 and the drum 16 remains at a constant level and is not lowered as it revolves.

The construction of the link conveyor 12 can best be seen from an inspection of Figures 2 and 4, and it will be noted that the conveyor 12 is formed from a plurality of links 70, each of which is rigidly secured by means of pins 72 extending through apertures formed in the bifurcated ears 74 formed in the links 70. The bifurcated ears 74 are adapted to intermesh with the single ear 76 formed in the links 78 next adjacent to the links 70, recesses as at 80 having been provided for reception of the bifurcated ears 74. The links or side pieces 70 and 78 are arranged in pairs and have rollers 82 mounted on shafts 84 extending through apertures, as at 86, therein and extending therebetween. Stub shafts, as at 88, are provided for mounting drive gears 90 which intermesh with gears 92 mounted on the shafts 84 of the rollers 82. When it is desired to use the device as a power operated conveyor for level operation, it is merely necessary to apply power by means of a shaft, such as at 94, connected to one of the gears 90 for rotating the entire conveyor except where one of the links is rotated out of abutting engagement with the next adjacent link, at the point indicated generally at 96 in Fig. 2.

In lieu of the stub shafts 88, every fourth link may be provided with an elongated shaft extending between the opposed side pieces of the link, thereby rigidifying the structure.

In Figure 7, there is disclosed a modified form of side piece, generally indicated by reference numeral 98, which has a tongue 100 and a groove 102 therein. The advantage of the side piece 98 is that it is interchangeable and eliminates necessity of two different types of side pieces, such as at 70 and 78. In addition, for rigidifying the entire structure, the opposed sets of side pieces 98 may be arranged with the tongues 100 of one side of side pieces 98 being nearest the drum 16 while the groove 102 of the other set of side pieces may be placed most adjacent the drum 16.

It is to be noted that the guide blocks 44 and 47 can carry a bracket 104 having rollers as at 106 thereon and carrying means as at 108 for reception of a hook or like latch 110 of a feed conveyor 112 so that material may be delivered onto the feed end of the conveyor 12.

In operation, packages or other articles may be fed from conveyor 102 to conveyor 12 and stacked as indicated in Fig. 1, for example. As successive stacks are formed, the operator may move the standard 14 stepwise toward the position shown in dash lines in Fig. 1. It may be assumed that the spring 52 has been given an initial tension as heretofore described, and that the sleeve 26 is locked with respect to the support block 47, the toothed wheel 60 being in engagement with both sets of lugs 66, 68. Accordingly, when standard 14 is moved (or drawn by spring 52) toward the drum 16, the drum 16 and shaft 22 rotate, causing a corresponding rotation of the conical reels 30, unwinding the cables 32 and permitting the support blocks 44, 47 to descend. This lowers the entire assembly carried by the support blocks 44, 47, including the drum 16 and the portion of the conveyor 12 which is attached thereto.

In the foregoing manner, the conveyor 12 may be wound and unwound on and from the drum 16 in any desired sequence, for a wide variety of package handling or other operations.

Since from the foregoing, the construction and advantages of this conveyor system are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to which fall within the scope of the appended claims.

What is claimed as new is as follows:

1. A conveyor system comprising in combination supporting means, a drum, a flexible conveyor attached to said drum and arranged to be wound around said drum, and means mounting said drum upon said supporting means for raising and lowering said drum upon rotation of said drum to change the elevation of said drum as said conveyor is wound around said drum.

2. A conveyor system comprising in combination supporting standards, a drum, a flexible link conveyor attached at one end to said drum and arranged to be wound around said drum, a pair of support blocks, a shaft journaled in said support blocks, said drum being mounted on said shaft, and means attaching said shaft to said supporting standards for raising and lowering said drum upon rotation of said drum to maintain said conveyor at a selected angular inclination.

3. A conveyor system comprising in combination supporting standards, a drum, a link conveyor attached at one end to said drum, a pair of support blocks, a shaft journaled in said support blocks, said drum being mounted on said shaft, clutch means for selectively locking said shaft to said drum and for locking said shaft to one of said support blocks to prevent rotation of said shaft relative to said one of said support blocks, and means attaching said shaft to said supporting standard for raising and lowering said drum upon rotation of said drum to maintain said conveyor at a selected angular inclination.

4. A conveyor system comprising in combination supporting standards, a drum, a link conveyor attached at one end to said drum, a pair of support blocks, a shaft journaled in said support blocks, said drum being mounted on said shaft, conical reels secured to said shaft, cables wound on said reels, said cables having ends supported by said standards so that upon rotation of said shaft said cables will be selectively wound on and unwound from said reels to raise and lower said drum to automatically maintain said conveyor at a selected angular inclination.

5. A conveyor system comprising in combination supporting standards, a drum, a link conveyor attached at one end to said drum, a pair of support blocks, a shaft journaled in said support blocks, said drum being mounted on said shaft, clutch means for selectively locking said shaft to said drum and for locking said shaft to one of said support blocks to prevent rotation of said shaft relative to said one of said support blocks, conical reels secured to said shaft, cables wound on said reels, said cables having ends supported by said standards so that upon rotation of said shaft said cables will be selectively wound on and unwound from said reels to raise and lower said drum to automatically maintain said conveyor at a selected angular inclination.

6. A conveyor system comprising in combination supporting standards, a drum, a link conveyor attached at one end to said drum, a pair of support blocks, a shaft journaled in said support blocks, said drum being mounted on said shaft, guide bars carried by said standards, said guide bars having slots therein, roller guides carried by said guide bars, conical reels secured to said shaft, cables wound on said reels, said cables having ends secured to said roller guides so that upon rotation of said shaft said cables will be selectively wound on and unwound from said reels to raise and lower said drum to automatically maintain said conveyor at a selected angular inclination.

7. A conveyor system comprising in combination supporting standards, a drum, a link conveyor attached at one end to said drum, a pair of support blocks, a shaft journaled in said support blocks, said drum being mounted on said shaft, clutch means for selectively locking said shaft to said drum and for locking said shaft to one of said support blocks to prevent rotation of said shaft relative to said one of said support blocks, guide bars carried by said standards, said guide bars having slots therein, roller guides carried by said guide bars, conical reels secured to said shaft, cables wound on said reels, said cables having ends secured to said roller guides so that upon rotation of said shaft said cables will be selectively wound on and unwound from said reels to raise and lower said drum to automatically maintain said conveyor at a selected angular inclination.

8. A conveyor system comprising in combination supporting standards, a drum, a link conveyor attached at one end to said drum, a pair of support blocks, a shaft journaled in said support blocks, said drum being mounted on said shaft, a sleeve journaled about said shaft, a tongue spring terminally secured to said sleeve and said shaft, opposed sets of lugs carried by said supporting blocks and said drum, a first clutch member carried by said shaft, a second clutch member carried by said sleeve, said shaft being slidable relative to said support blocks, said clutch members being engageable with said sets of lugs, and means attaching said shaft to said supporting standards for raising and lowering said drum upon rotation of said drum to maintain said conveyor at a selected angular inclination.

9. A conveyor system comprising in combination supporting standards, a drum, a link conveyor attached at one end to said drum, a pair of support blocks, a shaft journaled in said support blocks, said drum being mounted on said shaft, a sleeve journaled about said shaft, a tongue spring terminally secured to said sleeve and said shaft, opposed sets of lugs carried by said supporting blocks and said drum, a first clutch member carried by said shaft, a second clutch member carried by said sleeve, said shaft being slidable relative to said support blocks, said clutch members being engageable with said sets of lugs, conical reels secured to said shaft, cables wound on said reels, said cables having ends supported by said standards so that upon rotation of said shaft said cables will be selectively wound on and unwound from said reels to raise and lower said drum to automatically maintain said conveyor at a selected angular inclination.

10. A conveyor system comprising in combination supporting standards, a drum, a link conveyor attached at one end to said drum, a pair of support blocks, a shaft journaled in said support blocks, said drum being mounted on said shaft, a sleeve journaled about said shaft, a tongue spring terminally secured to said sleeve and said shaft, opposed sets of lugs carried by said supporting blocks and said drum, a first clutch member carried by said shaft, a second clutch member carried by said sleeve, said shaft being slidable relative to said support blocks, said clutch members being engageable with said sets of lugs, guide bars carried by said standards, said guide bars having slot therein, roller guides carried by said guide bars, conical reels secured to said shaft, cables wound on said reels, said cables having ends secured to said roller guides so that upon rotation of said shaft said cables will be selectively wound on and unwound from said reels to raise and lower said drum to automatically maintain said conveyor at a selected angular inclination.

11. A conveyor system comprising in combination supporting means, a drum, a link conveyor attached at one end to said drum, and means mounting said drum upon said supporting means for raising and lowering said drum upon rotation of said drum to maintain said conveyor at a selected angular inclination, said link conveyor comprising a plurality of links pivotally hingedly secured to each other, said links each including spaced side members, rollers journaled in said links, and drive means for rotating said rollers when said side members are in abutting relationship.

12. A conveyor system comprising in combination supporting means, a drum, a link conveyor attached at one end to said drum, and means mounting said drum upon said supporting means for raising and lowering said drum upon rotation of said drum to maintain said conveyor at a selected angular inclination, said link conveyor comprising a plurality of links pivotally hingedly secured to each other, said links each including spaced side members, rollers journaled in said links, and drive means for rotating said rollers when said side members are in abutting relationship, each of said side members having a tongue in one edge and a groove in the other edge thereof, the tongue of one of said side mmebers seating in the groove of the next adjacent side member.

13. A conveyor system comprising in combination supporting means, a drum, a link conveyor attached at one end to said drum, and means mounting said drum upon said supporting means for raising and lowering said drum upon rotation of said drum to maintain said conveyor at a selected angular inclination, said link conveyor comprising a plurality of links pivotally hingedly secured to each other, said links each including spaced side members, rollers journaled in said links, and drive means for rotating said rollers when said side members are in abutting relationship, each of said side members having interlocking intermeshing gears, the gears of one side member being adapted to overly gears of the next adjacent side member.

14. A conveyor system comprising in combination supporting standards, a drum, a link conveyor attached at one end to said drum, a pair of support blocks, a shaft journaled in said support blocks, said drum being mounted on said shaft, a sleeve journaled about said shaft, a tongue spring terminally secured to said sleeve and said shaft, opposed sets of lugs carried by said supporting blocks and said drum, a first clutch member carried by said shaft, a second clutch member carried by said sleeve, said shaft being slidable relative to said support blocks, said clutch members being engageable with said sets of lugs, guide bars carried by said standards, said guide bars having slots therein, roller guides carried by said guide bars, conical reels secured to said shaft, cables wound on said reels, said cables having ends secured to said roller guides so that upon rotation of said shaft said cables will be selectively wound on and unwound from said reels to raise and lower said drum to automatically maintain said conveyor at a selected angular inclination, said link conveyor comprising a plurality of links pivotally hingedly secured to each other, said links each including spaced side members, rollers journaled in said links, and drive means for rotating said rollers when said side members are in abutting relationship.

15. A conveyor system comprising in combination supporting means, a drum, a link conveyor attached at one end to said drum, and means mounting said drum upon said supporting means for raising and lowering said drum upon rotation of said drum to maintain said conveyor at a selected angular inclination, said link conveyor comprising a plurality of links pivotally hingedly secured to each other, said links each including spaced side members, rollers journaled in said links, and drive means for rotating said rollers when said side members are in abutting relationship, said drive means including gears mounted on said rollers, other gears rotatably mounted on said side members engageable with the gears on said rollers, and means connected to one of said gears for rotating the gears on said rollers and hence said rollers.

16. A conveyor system comprising in combination supporting standards, a drum, a link conveyor attached at one end to said drum, a pair of support blocks, a shaft journaled in said support blocks, said drum being mounted on said shaft, a sleeve journaled about said shaft, a tongue spring terminally secured to said sleeve and said shaft, opposed sets of lugs carried by said supporting blocks and said drum, a first clutch member carried by said shaft, a second clutch member carried by said sleeve, said shaft being slidable relative to said support blocks, said clutch members being engageable with said sets of lugs, guide bars carried by said standards, said guide bars having slots therein, roller guides carried by said guide bars, conical reels secured to said shaft, cables wound on said reels, said cables having ends secured to said roller guides so that upon rotation of said shaft said cables will be selectively wound on and unwound from said reels to raise and lower said drum to automatically maintain said conveyor at a selected angular inclination, said link conveyor comprising a plurality of links pivotally hingedly secured to each other, said links each including spaced side members, rollers journaled in said links, and drive means for rotating said rollers when said side members are in abutting relationship, said drive means including gears mounted on said rollers, other gears rotatably mounted on said side members engageable with the gears on said rollers, and means connected to one of said gears for rotating the gears on said rollers and hence said rollers.

17. A conveyor system comprising in combination a supporting means, a drum, a flexible conveyor attached to said drum and arranged to be wound around said drum, means operatively associated with said drum for maintaining said drum on said supporting means for revolution about an axis at a fixed level thereon, further mounting means operatively associated with said drum for raising or lowering said drum upon rotation of said drum, and selective means for connecting said drum selectively either to the first mentioned mounting means or to said further mounting means.

References Cited in the file of this patent

UNITED STATES PATENTS 916,853    Fonner _____ Mar. 30, 1909